(12) United States Patent
Luo et al.

(10) Patent No.: US 10,242,061 B2
(45) Date of Patent: *Mar. 26, 2019

(54) DISTRIBUTED EXECUTION OF EXPRESSIONS IN A QUERY

(71) Applicant: International Business Machines Corporation, Armonk, NY (US)

(72) Inventors: Lin Luo, Ottawa (CA); Martin Petitclerc, Saint-Nicolas (CA)

(73) Assignee: International Business Machines Corporation, Armonk, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 14/663,617

(22) Filed: Mar. 20, 2015

(65) Prior Publication Data

US 2015/0347512 A1    Dec. 3, 2015

Related U.S. Application Data

(63) Continuation of application No. 14/291,077, filed on May 30, 2014.

(51) Int. Cl.
*G06F 17/30* (2006.01)

(52) U.S. Cl.
CPC .. *G06F 17/30477* (2013.01); *G06F 17/30442* (2013.01); *G06F 17/30469* (2013.01);
(Continued)

(58) Field of Classification Search
CPC ... G06F 17/30864; G06Q 10/10; G06Q 30/02
See application file for complete search history.

(56) References Cited

U.S. PATENT DOCUMENTS 6,493,718 B1   12/2002   Petculescu et al.
7,779,031 B2    8/2010   Grosset et al.
(Continued)

FOREIGN PATENT DOCUMENTS

GB    2495808 A    4/2013

OTHER PUBLICATIONS

Anonymous, "System and Method of detecting sub-result-set query for MDX optimization," IP.com Prior Art Database Technical Disclosure, IP.com No. IPCOM000216927D, Published Apr. 25, 2012 http://ip.com/IPCOM/000216927.
(Continued)

*Primary Examiner* — Alex Gofman
(74) *Attorney, Agent, or Firm* — Nolan M. Lawrence (57) ABSTRACT

A computer-implemented method for executing a query specification can include evaluating the query specification by a first computing device to identify a candidate expression in the query specification to be executed by a second computing device hosting a source of data specified in the candidate expression. A cost estimate for executing the candidate expression at the first computing device is determined. Whether the cost estimate of executing the candidate expression at the first computing device is greater than a threshold is determined. The candidate expression is replaced with a native query function when the cost estimate of executing the candidate expression at the first computing device is greater than the threshold. The native query function can be executed at the second computing device. It can be determined whether a runtime context is necessary, and if necessary, a context parameter is injected into the native query function.

10 Claims, 5 Drawing Sheets

(52) U.S. Cl.
CPC .. *G06F 17/30474* (2013.01); *G06F 17/30592* (2013.01); *G06F 17/30864* (2013.01)

(56) References Cited

U.S. PATENT DOCUMENTS

| | | | | |
|---|---|---|---|---|
| 7,984,043 | B1* | 7/2011 | Waas | G06F 17/30932 707/718 |
| 8,447,854 | B1* | 5/2013 | Jasinskyj | H04L 43/0876 709/224 |
| 8,533,218 | B2 | 9/2013 | Debrot et al. | |
| 2009/0012948 | A1* | 1/2009 | Koch | G06F 17/30427 |
| 2009/0276394 | A1* | 11/2009 | Bestgen | G06F 17/30463 |
| 2012/0059814 | A1* | 3/2012 | Sejnoha | G06F 17/30864 707/707 |
| 2012/0203762 | A1* | 8/2012 | Kakarlamudi | G06F 17/30463 707/718 |
| 2013/0097114 | A1 | 4/2013 | Burke et al. | |
| 2013/0097151 | A1 | 4/2013 | Cushing et al. | |
| 2014/0074771 | A1* | 3/2014 | He | G06F 17/30592 707/602 |

OTHER PUBLICATIONS

Campbell et al., "IBM Cognos Dynamic Query," Sep. 2013, 124 pages, IBM Redbooks http://www.redbooks.ibm.com/abstracts/sg248121.html.

IBM, "IBM Cognos Business Intelligence V10.2.1," IBM United States Software Announcement 213-262, Dated Jun. 11, 2013, pp. 1-49. Grace Period Disclosure.

IBM, "Visual Explain Tutorial," 115 pages, © Copyright IBM Corp. 2002, 2007 ftp://ftp.software.ibm.com/ps/products/db2/info/vr95/pdf/en_US/db2tve950.

Unknown, "Module 10: Supplemental Material," Algorithms and Data Structures I, 21 pages, The George Washington University, Washington DC http://www.seas.gwu.edu/~drum/cs1112/lectures/module10/suppl/index.html.

Luo et al., "Distributed Execution of Expressions in a Query," U.S. Appl. No. 14/291,077, filed May 30, 2014.

List of IBM Patents or Patent Applications Treated as Related.

* cited by examiner

DISTRIBUTED EXECUTION OF EXPRESSIONS IN A QUERY

STATEMENT REGARDING PRIOR DISCLOSURES BY THE INVENTOR OR A JOINT INVENTOR

The following disclosure(s) are submitted under 35 U.S.C. 102(b)(1)(A): IBM United States Software Announcement 213-262, dated Jun. 11, 2013, entitled IBM Cognos Business Intelligence V10.2.1.

BACKGROUND

This disclosure relates generally to executing a generic query specification containing one or more expressions, and more specifically, to executing an expression in a query specification in a computer system that hosts underlying source data, rather than executing the expression at a computing device configured for performing queries and analysis of data stored in multiple databases.

Multidimensional Expression (MDX) language is a query language for retrieving data from a multidimensional data structure, such as an Online Analytical Processing (OLAP) data structure. The MDX language also includes the capability to perform calculations on data retrieved in a query. Multidimensional data structures and query languages can be used by an enterprise to facilitate data analysis, such as ad hoc analysis and queries. A computing device can be configured for performing ad hoc queries and analysis of data stored in multiple databases. Computing devices configured for these purposes may include a cache of OLAP data.

Structured Query Language (SQL) is a language used to access data stored in a relational database. A relational database, in contrast to a multidimensional or OLAP database, organizes data in two dimensions, i.e., as tables having rows and columns. A relational database is typically used in an enterprise to store large quantities of transactional data and can be used by anyone involved with processing transactions. In contrast, a multidimensional or OLAP database is typically used in an enterprise by a smaller group of individuals, such as a marketing department, to perform ad hoc queries.

SUMMARY

Various embodiments are directed to a computer-implemented method for executing a query specification. The method can include evaluating the query specification by a first computing device. The query specification is evaluated to identify an expression in the query specification as a candidate expression to be executed by a second computing device hosting a source of data specified in the candidate expression. In addition, the method can include determining a cost estimate of executing the candidate expression at the first computing device. Further, the method can include determining whether the cost estimate of executing the candidate expression at the first computing device is greater than a threshold. Moreover, the method can include replacing the candidate expression with a native query function when the cost estimate of executing the candidate expression at the first computing device is greater than the threshold.

In various embodiments, the method can include executing the native query function at the second computing device hosting the source of data specified in the candidate expression. The method can also include determining whether a runtime context is necessary to execute the native query function. Additionally, the method can include generating a context parameter for the native query function.

In various embodiments, the determining of a cost estimate of executing the candidate expression at the first computing device can include determining one of a first amount of memory required at the first computing device, a first amount of bandwidth required to transfer a result set from the second computing device to the first computing device, or a first number of CPU cycles required at the first computing device. In various embodiments, the threshold can be one of a first amount of memory, a first amount of bandwidth, or a first number of CPU cycles. Moreover, in various embodiments, the method can include translating a term of the candidate expression expressed into a term understood by the second computing device hosting the source of data specified in the candidate expression. The method can also include parsing the query specification to identify a particular expression in the query specification as a candidate expression.

Various embodiments are directed to a system for executing a query specification. The system can include a first computing device having a processor and a memory. The memory can store a query transformation engine and a query execution engine. The query transformation and execution engines, when executed by the processor, are operable to perform the following operations: An operation to evaluate the query specification to identify an expression in the query specification as a candidate expression to be executed by a second computing device hosting a source of data specified in the candidate expression. An operation to determine a cost estimate of executing the candidate expression at the first computing device. An operation to determine whether the cost estimate of executing the candidate expression at the first computing device is greater than a threshold. In addition, an operation to replace the candidate expression with a native query function when the cost estimate of executing the candidate expression at the first computing device is greater than the threshold.

In various embodiments, query transformation and execution engines can perform one or more of the following additional operations: An operation to execute the native query function at the second computing device hosting the source of data specified in the candidate expression. An operation to determine whether a runtime context is necessary to execute the native query function and, in response to determining that a runtime context is necessary to execute the native query function, to generate a context parameter for the native query function.

In various embodiments, the determining of a cost estimate of executing the candidate expression at the first computing device can include determining one of a first amount of memory required at the first computing device. Further, the determining of a cost estimate of executing the candidate expression at the first computing device can include determining a first amount of bandwidth required to transfer a result set from the second computing device to the first computing device. Additionally, the determining of a cost estimate of executing the candidate expression at the first computing device can include determining a first number of CPU cycles required at the first computing device. Moreover, the threshold can be one of a first amount of memory, a first amount of bandwidth, or a first number of CPU cycles.

Various embodiments are directed to a computer program product for executing a query specification. The computer program product comprises a computer readable storage medium having program code embodied therewith. The program code comprises computer readable program code configured for evaluating the query specification to identify an expression in the query specification as a candidate expression to be executed by a second computing device hosting a source of data specified in the candidate expression. In addition, the program code can be configured for determining a cost estimate of executing the candidate expression at the first computing device. Moreover, the program code can be configured for determining whether the cost estimate of executing the candidate expression at the first computing device is greater than a threshold. Further, the program code can be configured for replacing the candidate expression with a native query function when the cost estimate of executing the candidate expression at the first computing device is greater than the threshold.

In various embodiments, the computer program product is configured or operable to cause the native query function to be executed at the second computing device hosting the source of data specified in the candidate expression. Moreover, in various embodiments, the candidate expression can be a filter function, a top count function, or can include a function that is evaluated in a different context than a context in which a nested function of the expression is evaluated.

The above summary is not intended to describe each illustrated embodiment or every implementation of the present disclosure.

BRIEF DESCRIPTION OF THE DRAWINGS

In the Figures and the Detailed Description, like numbers refer to like elements.

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate generally to executing a generic query specification containing one or more expressions, and more particular aspects relate to executing an expression in a query specification in a computing device that hosts underlying source data, rather than executing the expression at a computing device configured for performing queries and analysis of data stored in multiple databases. While the present disclosure is not necessarily limited to such applications, various aspects of the disclosure may be appreciated through a discussion of various examples using this context.

Figure 1:
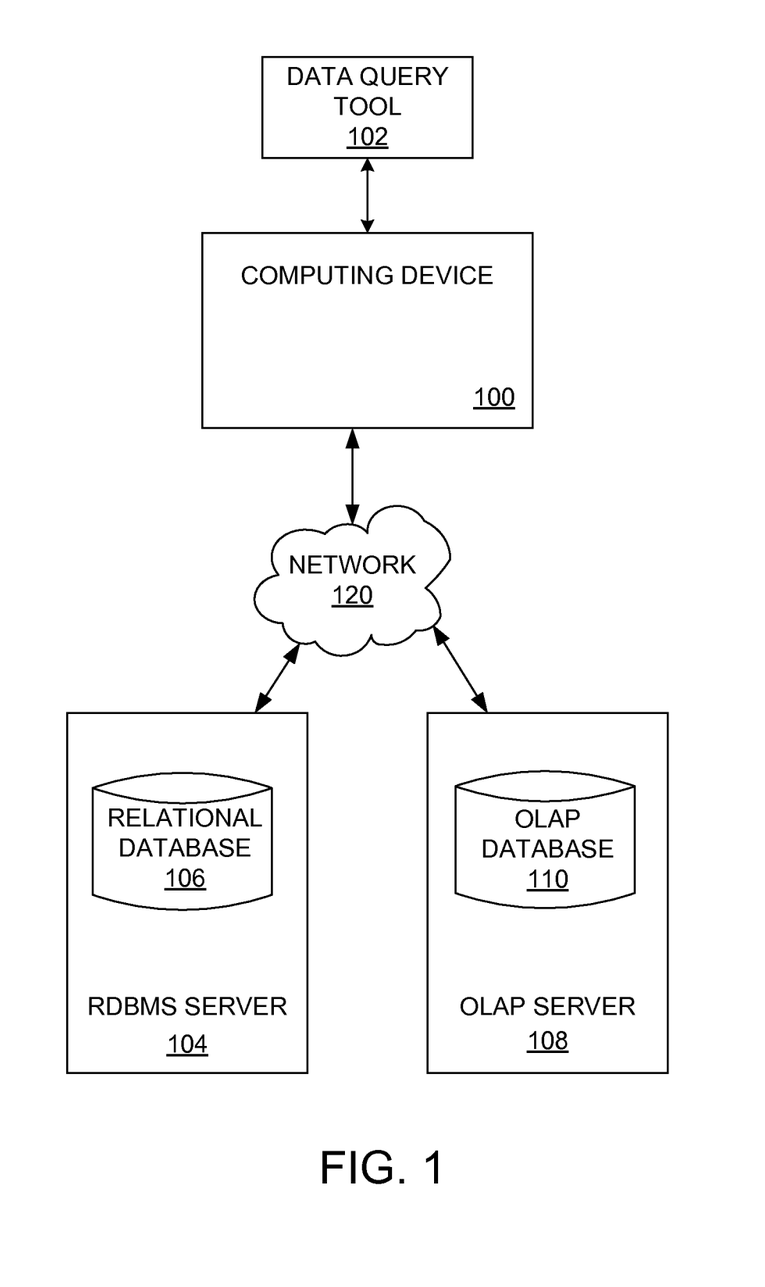
FIG. 1 is a block diagram of one example of a computing environment that includes a computing device and database servers in which embodiments of this disclosure can be implemented.

FIG. 1 is a block diagram of one computing environment in which embodiments of this disclosure can be implemented. The computing environment includes a computing device 100, a data query tool 102, and two or more database servers 104 and 108, which are communicatively coupled to the computing device 100 via one or more communications networks 120. The data query tool may reside on the computing device 100 or on a distinct computing device. The computing device 100 may be configured for performing queries and analysis of data stored in multiple databases. The computing device 100 may be referred to as "first" computing device. The database server 104 is intended to represent one or more relational database management system (RDBMS) servers for accessing one or more relational databases 106. The database server 108 is intended to represent one or more online analytical processing (OLAP) servers for accessing one or more OLAP databases 110. The database server 104 or the database server 108 may be referred to as a "second" computing device. The communications network 120 may include one or more servers, networks, or databases, and may use a particular communication protocol to transfer data between the devices.

Figure 2:
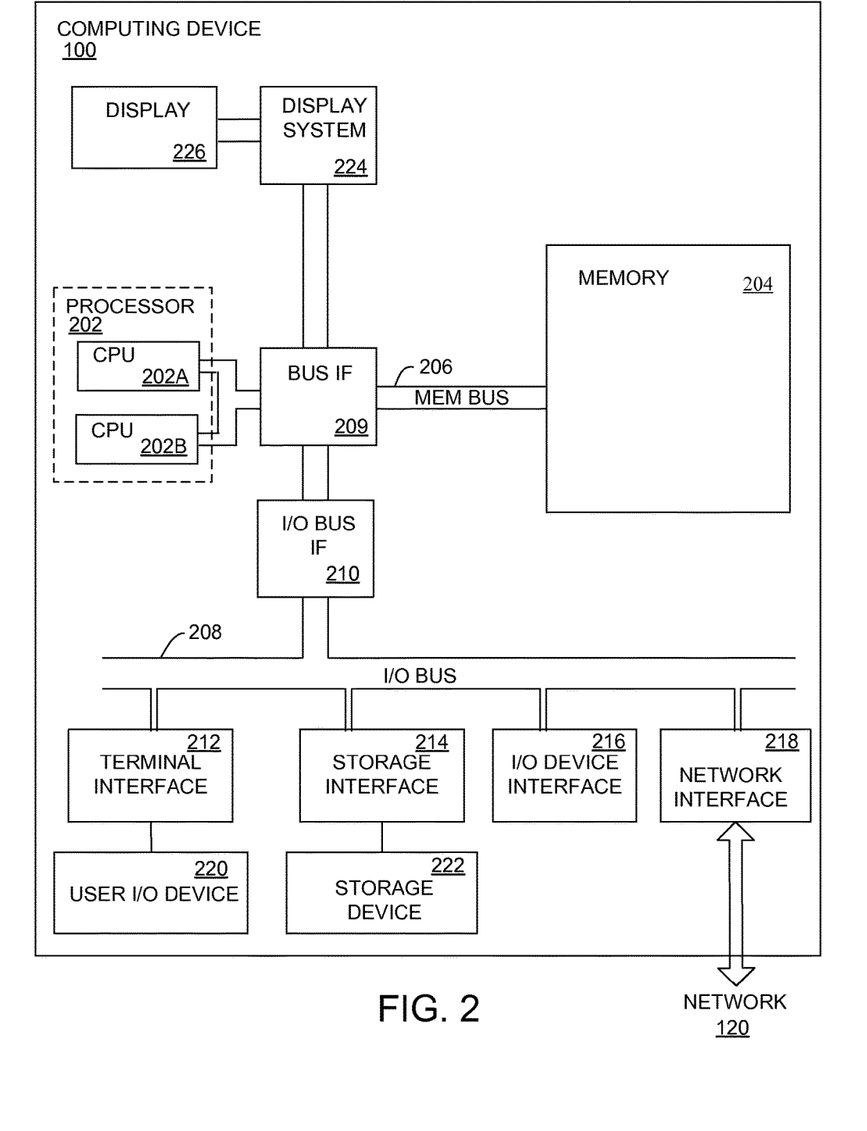
FIG. 2 is a block diagram of an example of the computing device of FIG. 1, the computing device having a memory, according to various embodiments.

FIG. 2 is a more detailed view, in block diagram form, of the computing device 100 according to various embodiments. The computing device 100 is an example of a context in which embodiments may be implemented. The mechanisms and apparatus of the various embodiments disclosed herein apply equally to any appropriate computing device. The major components of the computing device 100 include one or more processors 202, a memory 204, a terminal interface 212, a storage interface 214, an Input/Output ("I/O") device interface 216, and a network interface 218, all of which are communicatively coupled, directly or indirectly, for inter-component communication via a memory bus 206, an I/O bus 208, bus interface unit ("IF") 209, and an I/O bus interface unit 210. Note the database server 104 and the database server 108 may include the same or similar components.

The computing device 100 may contain one or more general-purpose programmable central processing units (CPUs) 202A and 202B, herein generically referred to as the processor 202. In an embodiment, the computing device 100 may contain multiple processors; however, in another embodiment, the computing device 100 may alternatively be a single CPU device. Each processor 202 executes instructions stored in the memory 204 and may include one or more levels of on-board cache.

In an embodiment, the memory 204 may include a random-access semiconductor memory, storage device, or storage medium (either volatile or non-volatile) for storing or encoding data and programs. In another embodiment, the memory 204 represents the entire virtual memory of the computing device 100, and may also include the virtual memory of other computer systems coupled to the computing device 100 or connected via a network 120. The memory 204 is conceptually a single monolithic entity, but in other embodiments the memory 204 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Figure 3:
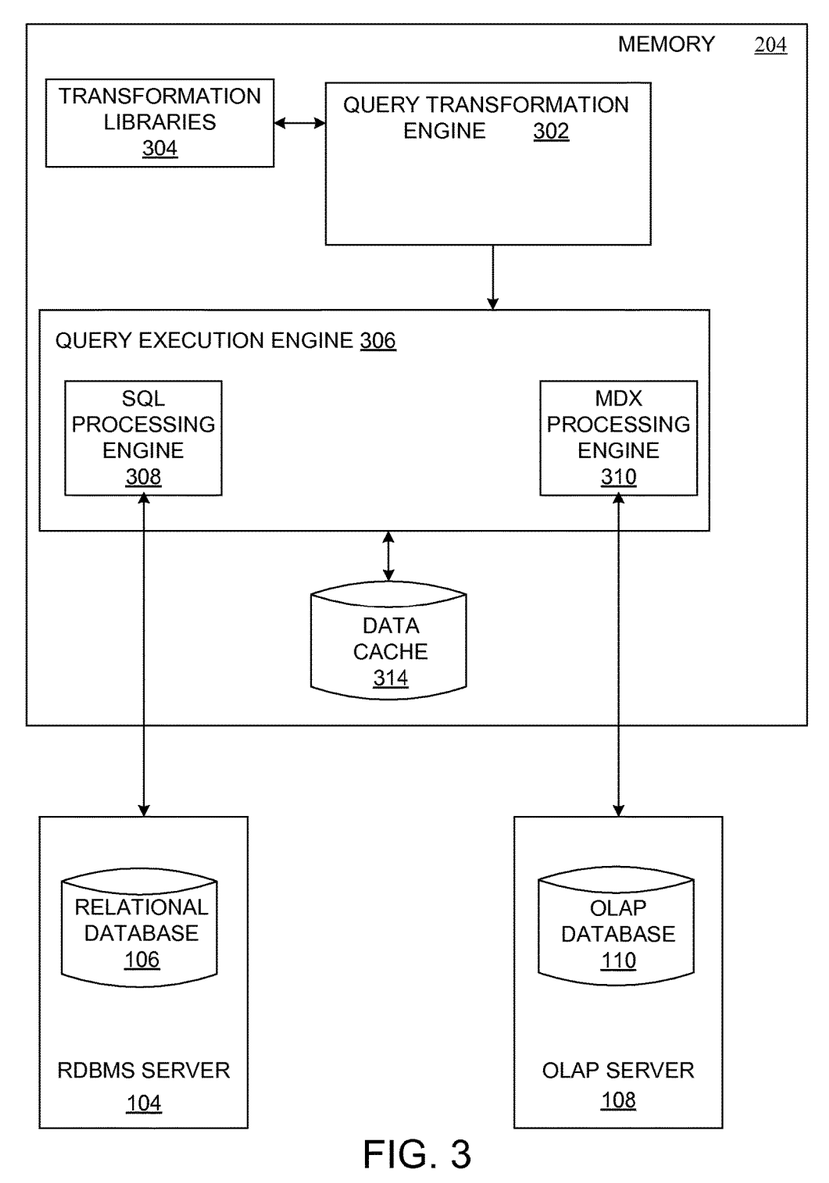
FIG. 3 is a block diagram of an example of components and data that can reside in the memory of FIG. 2 and the relationship of particular components to the database servers of FIG. 1, according to various embodiments.

The memory 204 may store all or a portion of the components and data shown in FIG. 3. These programs and data structures are illustrated in FIG. 3 as being included within the memory 204 in the computing device 100, however, in other embodiments, some or all of them may be on different computer systems and may be accessed remotely, e.g., via a network 120. The computing device 100 may use virtual addressing mechanisms that allow the programs of the computing device 100 to behave as if they only have access to a large, single storage entity instead of access to multiple, smaller storage entities. Thus, while the components and data shown in FIG. 3 are illustrated as being included within the memory 204, these components and data are not necessarily all completely contained in the same storage device at the same time. Further, although the components and data shown in FIG. 3 are illustrated as being separate entities, in other embodiments some of them, portions of some of them, or all of them may be packaged together.

In an embodiment, the components and data shown in FIG. 3 may include instructions or statements that execute on the processor 202 or instructions or statements that are interpreted by instructions or statements that execute on the processor 202 to carry out the functions as further described below. In another embodiment, the components shown in FIG. 3 may be implemented in hardware via semiconductor devices, chips, logical gates, circuits, circuit cards, and/or other physical hardware devices in lieu of, or in addition to, a processor-based system. In an embodiment, the components shown in FIG. 3 may include data in addition to instructions or statements.

The computing device 100 may include a bus interface unit 209 to handle communications among the processor 202, the memory 204, a display system 224, and the I/O bus interface unit 210. The I/O bus interface unit 210 may be coupled with the I/O bus 208 for transferring data to and from the various I/O units. The I/O bus interface unit 210 communicates with multiple I/O interface units 212, 214, 216, and 218, which are also known as I/O processors (IOPs) or I/O adapters (IOAs), through the I/O bus 208. The display system 224 may include a display controller, a display memory, or both. The display controller may provide video, audio, or both types of data to a display device 226. The display memory may be a dedicated memory for buffering video data. The display system 224 may be coupled with a display device 226, such as a standalone display screen, computer monitor, television, or a tablet or handheld device display. In an embodiment, the display device 226 may include one or more speakers for rendering audio. Alternatively, one or more speakers for rendering audio may be coupled with an I/O interface unit. In alternate embodiments, one or more of the functions provided by the display system 224 may be on board an integrated circuit that also includes the processor 202. In addition, one or more of the functions provided by the bus interface unit 209 may be on board an integrated circuit that also includes the processor 202.

The I/O interface units support communication with a variety of storage and I/O devices. For example, the terminal interface unit 212 supports the attachment of one or more user I/O devices 220, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 220 and the computing device 100, and may receive output data via the user output devices. For example, a user interface may be presented via the user I/O device 220, such as displayed on a display device, played via a speaker, or printed via a printer.

The storage interface 214 supports the attachment of one or more disk drives or direct access storage devices 222 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 222 may be implemented via any type of secondary storage device. The contents of the memory 204, or any portion thereof, may be stored to and retrieved from the storage device 222 as needed. The I/O device interface 216 provides an interface to any of various other I/O devices or devices of other types, such as printers or fax machines. The network interface 218 provides one or more communication paths from the computing device 100 to other digital devices and computer systems, such as the database servers 104 and 108; these communication paths may include, e.g., one or more networks 120.

Although the computing device 100 shown in FIG. 2 illustrates a particular bus structure providing a direct communication path among the processors 202, the memory 204, the bus interface 209, the display system 224, and the I/O bus interface unit 210, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 100 may, in fact, contain multiple I/O bus interface units 210 and/or multiple I/O buses 208. While multiple I/O interface units are shown, which separate the I/O bus 208 from various communications paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

FIG. 2 is intended to depict the representative major components of the computing device 100. Individual components, however, may have greater complexity than represented in FIG. 2, components other than or in addition to those shown in FIG. 2 may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different manners, including using various computer applications, routines, components, programs, objects, modules, data structures, etc., which may be referred to herein as "software," "computer programs," or simply "programs."

FIG. 3 is a block diagram of an example of components and data that can reside in the memory 204 and the relationship of the particular components to the database servers 104 and 108, according to various embodiments. A query transformation engine 302 implements a query planning function. A generic query specification can arrive at the query transformation engine 302 from the data query tool 102. The query specification describes data that is required from one or more underlying data sources in order to render a report, perform a specified analysis, generate a dashboard, or perform a similar function. The query specification may be expressed in any suitable language. The query specification could be expressed as an MDX query, but query specifications are not limited to MDX. For example, the query specification could be expressed as an IBM Cognos report specification. An XML parser (that may be provided as component of the query transformation engine 302) converts the incoming query into an initial plan tree. The query transformation engine 302 checks each node in the plan tree to determine which query transforms apply to the node. The query transformation engine 302 uses rules and query transformations located in the transformation libraries 304. The query transformation engine 302 in conjunction with the transformation libraries 304 transforms the initial plan tree into a run or execution tree. The query transformation engine 302 may employ various rules to optimize a run tree in an optimization stage. The optimization stage may include multiple iterations or passes through the run tree. A run tree can include various types of nodes. A run tree can be executed by a local process at the computing device 100. Execution begins at leaf nodes. Results flow from leaf nodes up the tree to a root node. For example, first and second leaf nodes may retrieve data. The data obtained by the first and second leaf nodes may be joined at a join node. The joined data may flow up to the tree to a sort node, and so on.

Figure 4:
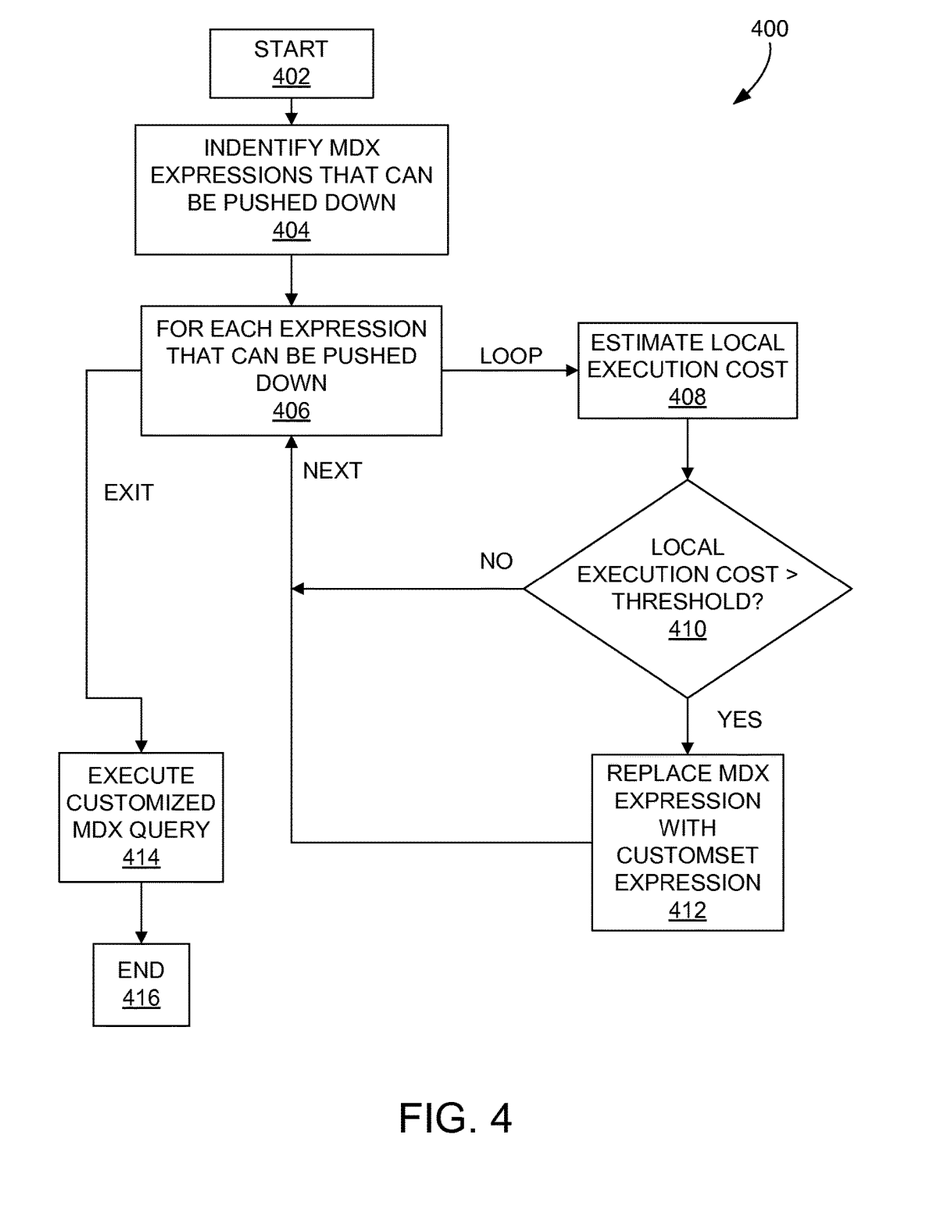
FIG. 4 is a flow diagram of a process for evaluating a query specification according to various embodiments.

In various embodiments, the query transformation engine 302 may be configured to perform operations 402-412 of a process 400 for determining whether an expression in a query specification is to be processed as an MDX query or is to be pushed down to the underlying data source for execution, as described in the flow diagram of FIG. 4. According to various embodiments, a run tree is not executed entirely as a local process at the computing device 100. The process 400 may be used to make a determination as to where a node is to be processed at any point in the planning stage when relevant information is available. For example, at a point in the planning stage where a query specification is being converted to an MDX query, it can be determined to push execution of an expression down an underlying data source. As another example, at a point in the planning stage where an MDX query is being optimized, it can be determined to push execution of an expression down an underlying data source.

More specifically, the query transformation engine 302 is configured to parse a query specification to identify one or more expressions within the query specification that are "candidate expressions." For example, a candidate expression is an expression that includes a Filter, a Top Count, or a Bottom Count operation or function. An example of a candidate expression is a filter expression that includes a complex expression, e.g., a filter to identify customers with unit sales greater than average sales within a set. Another example of a candidate expression is a filter function that needs to be evaluated in a different context than a nested function, e.g., a filter to identify customers with unit sales greater than average sales nested within a set that is further broken down, i.e., filtered, by industry to which the customer belongs. In this example, "customer with above average unit sales" is nested under an industry member set. The industries could be, for example, newspaper, radio, and television. Various candidate expressions may be predefined by a developer. Candidate expressions generally include expressions where it may make sense to push the expression as close as possible to a leaf node of a run tree. Using the filter operation as one example, it may make sense to perform a filter operation before a join operation because it can keep intermediate results that must move up from a leaf node to a root node as small as possible. Once identified, further analysis on the candidate expression is performed prior to pushing the expression down the run tree.

In particular, the query transformation engine 302 is configured to determine a cost estimate of executing the candidate expression at the computing device 100. This can include determining a first amount of memory required at the computing device 100 to execute the expression, determining a first amount of bandwidth required to transfer a result set from a database server to the computing device to the computing device 100 if the expression is executed at the computing device 100, or determining a first number of CPU cycles required at the computing device 100 to execute the expression at the computing device 100. Moreover, the query transformation engine 302 is configured to determine whether the cost estimate of executing the candidate expression at the computing device 100 is greater than a threshold. The threshold can be, for example, a first amount of memory that would be required to execute the candidate expression at the computing device 100, a first amount of bandwidth to transfer a result set from a database server to the computing device 100, or a first number of CPU cycles required to execute the candidate expression at the computing device 100. Additionally, the query transformation engine 302 is configured or is operable to replace the candidate expression with a CustomSet function when the cost estimate of executing the candidate expression at the computing device is greater than the threshold. Note replacing a candidate expression with a CustomSet function can include translating a term of the query specification into a term understood by the computing device hosting the underlying data source. The query transformation engine 302 determines whether a context injection is necessary to execute the CustomSet function. However, because context is generally not known at the query planning stage, the query transformation engine 302 may not inject context into the CustomSet function. The query transformation engine 302 also provides metadata information as part of the CustomSet function. The MDX engine will use this metadata to extract data from native sub query results returned by the CustomSet function.

The run tree generated by the query transformation engine 302 is provided to a query execution engine 306. The query execution engine 306 includes an SQL processing engine 308 and an MDX processing engine 310. A data cache 314 is provided to store results of multidimensional queries. The data cache 314 may include a subset of data from relational database 106 and OLAP database 110. The query execution engine 306 is configured to execute an SQL query against the relational database 106 using the SQL processing engine 308. In addition, the query execution engine 306 is configured to execute an MDX query against the multidimensional data cache 314, or if the requested data is not in the cache, against a multidimensional or OLAP database 110 using the MDX processing engine 310. Further, the query execution engine 306 is configured to inject a context parameter (if required) into a CustomSet function and to execute a CustomSet function.

FIG. 4 is a flow diagram of a process 400 for determining whether an expression in a query specification is to be processed by an MDX query or is to be pushed down to the underlying data source for execution, according to various embodiments. Various operations of the process 400 can be performed by the query transformation engine 302. The query specification typically includes multiple expressions. The process 400 starts at 202 and identifies one or more expressions in the query specification that can be pushed down to an underlying data provider in operation 404. Each identified expression is a candidate expression to be executed by a database server or other computing device hosting a source of data specified in the candidate expression, e.g., RDBMS server 104, depending on the results of subsequent operations in the process 400. A cost estimate for executing the candidate expression at the computing device 100 using the query execution engine 306 is determined in operation 408. In operation 410, it is determined whether the cost estimate of executing the candidate expression at the computing device is greater than a threshold. If the cost estimate is not greater than the threshold, the candidate expression will be executed by the query execution engine 306 at the computing device 100. On the other hand, if the cost estimate is greater than the threshold, the candidate expression will be pushed down to an underlying data provider for execution. In addition, the expression is replaced with a CustomSet expression that wraps a native query function in operation 412. The result of the process 400 is a customized multidimensional query that can include both multidimensional expressions and CustomSet expressions. The customized multidimensional query is executed in operation 414, as further described in FIG. 5.

Figure 5:
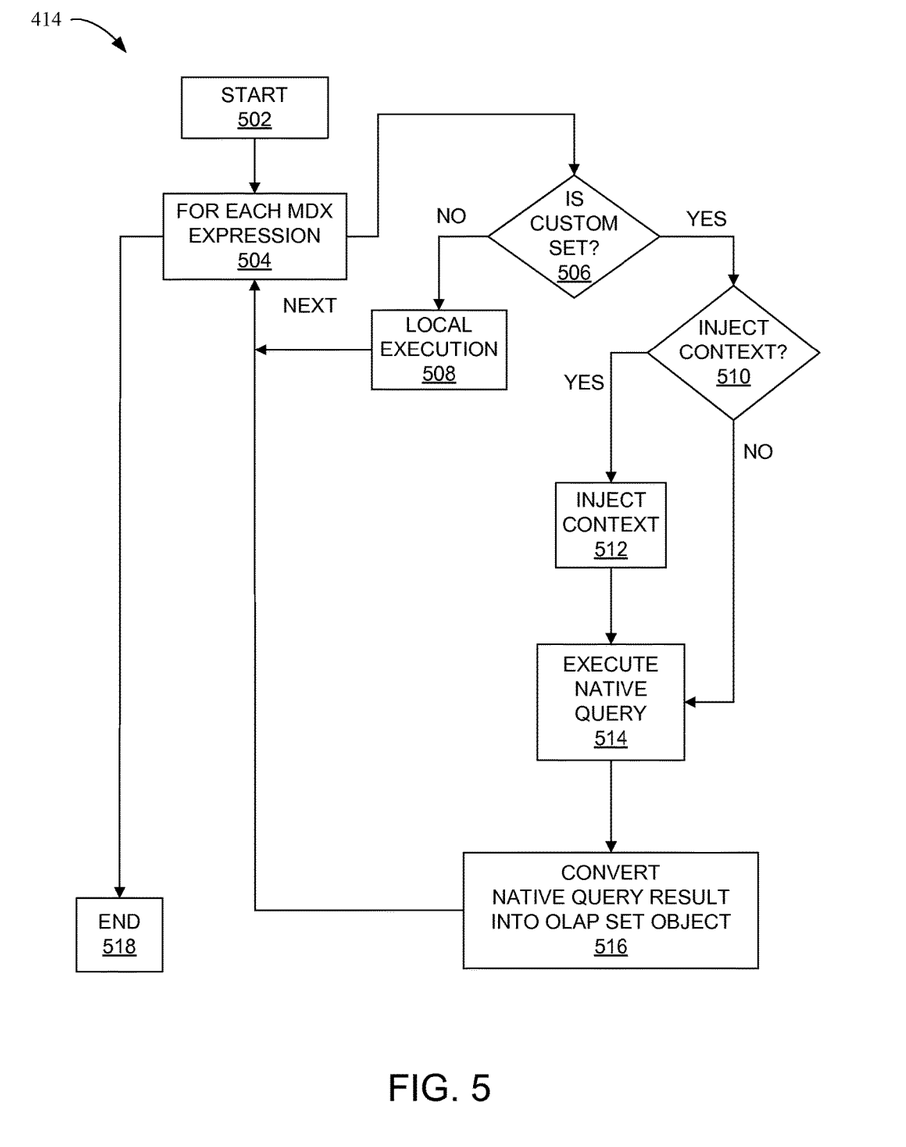
FIG. 5 is a flow diagram of a process for executing a customized query specification according to various embodiments.

FIG. 5 is a flow diagram of a process 414 for executing a customized multidimensional query according to various embodiments. The process 414 starts at 502 and is performed for each expression in the query, as indicated at 504. As noted, a run tree is executed beginning at one or more leaf nodes, with results flowing from leaf nodes up the tree to root nodes. Two or more leaf nodes can be executed independently and in parallel, with results from the respective leaf nodes being synchronized at a root node. Accordingly, more than one instance of the process 400 can be performed simultaneously on multiple leaf nodes. In operation 506, it is determined whether the expression is a CustomSet expression (wrapping a native query function). If the expression is not a CustomSet expression, the expression is executed locally in operation 508. In other words, the expression is evaluated locally using the multidimensional data cache 314, or if the data required to evaluate the expression is not in the cache, the expression is evaluated against OLAP database 110 or the relational database 106, as applicable. If the expression is a CustomSet expression, it is determined in operation 510 whether context is required to be injected into the expression. (As mentioned, whether or not context is required may be determined as part of the query planning process.) Where context is required, context will be available at runtime, but is generally not known to the Query Transformation Engine 302 at query planning time. Context is sometimes referred to as scope, and can be information such as a particular year or geographic location. If context is required, one or more context parameters are injected into the CustomSet expression in operation 512. In operation 514, the CustomSet expression is executed as a native query, such as an SQL query, against the data source underlying the multidimensional data cache 314 or multidimensional database 110. This data source may be, for example, the relational database 104. In addition, this native query is executed by the database server associated with an underlying data source, e.g., the RDBMS server 104, and not at the computing device 100. In operation 414, the native query result set returned from the underlying data source is converted into an OLAP object. Operation 414 maps SQL columns into multidimensional constructs, such as members, levels, and dimensions. The process 414 concludes at 416.

In an embodiment, the CustomSet function may be of the following form: CustomSet (NativeQuery_String, Metadata_LevelList, InjectingContext_Bool). NativeQuery_String is a valid native query string. Metadata_LevelList is a list of level metadata that represents a dimensionality of returning results. It indicates level member hierarchies that will be included in the result. InjectingContext_Bool is a Boolean value indicating whether it is necessary to inject a context parameter.

Aspects of the present disclosure may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for executing a query specification, comprising:

evaluating, by a first computing device configured to transform query specifications into queries for execution by the first computing device solely against databases hosted on other computing devices, a first query specification to identify at least one expression of a set of expressions as a candidate expression to be executed by a second computing device hosting a source of data specified in the candidate expression, the evaluation based on rules stored in a memory of the first computing device;

determining, by the first computing device, a cost estimate of executing the candidate expression at the first computing device;

determining, by the first computing device, whether the cost estimate of executing the candidate expression at the first computing device is greater than a threshold; and replacing, by the first computing device, the candidate expression with a native query function when the cost estimate of executing the candidate expression at the first computing device is greater than the threshold, wherein the native query function is wrapped with metadata that represents a dimensionality of returning results indicative of level member hierarchies that will be included in a result of the native query function and wherein the native query is wrapped with a value indicative of the requirement to inject a context parameter.

2. The method of claim 1, further comprising executing the native query function at the second computing device hosting the source of data specified in the candidate expression.

3. The method of claim 1, further comprising determining whether a runtime context is necessary to execute the native query function.

4. The method of claim 3, further comprising generating a context parameter for the native query function.

5. The method of claim 1, wherein the determining of the cost estimate of executing the candidate expression at the first computing device includes determining one of a first amount of memory required at the first computing device, a first amount of bandwidth required to transfer a result set from the second computing device to the first computing device, or a first number of CPU cycles required at the first computing device.

6. The method of claim 1, wherein the threshold is one of a first amount of memory, a first amount of bandwidth, or a first number of CPU cycles.

7. The method of claim 1, further comprising translating a term of the candidate expression expressed into a term understood by the second computing device hosting the source of data specified in the candidate expression.

8. The method of claim 1, further comprising parsing the query specification to identify a particular expression in the query specification as a candidate expression.

9. A computer-implemented method for executing a query specification, comprising:
    evaluating, by a first computing device during conversion of a first query specification to a locally-executable query, the first query specification to identify an expression in the first query specification as a candidate expression to be executed by a second computing device hosting a source of data specified in the candidate expression, wherein the conversion is performed by the first computing device and wherein the locally-executable query is executable by the first computing device against the source of data hosted on the second computing device;
    determining a cost estimate of executing the candidate expression at the first computing device;
    determining whether the cost estimate of executing the candidate expression at the first computing device is greater than a threshold; and
    replacing the candidate expression with a native query function when the cost estimate of executing the candidate expression at the first computing device is greater than the threshold, wherein the native query function is wrapped with a value indicative of the requirement to inject a context parameter and wherein the native query is wrapped with metadata that represents a dimensionality of returning results indicative of level member hierarchies that will be included in a result of the native query function.

10. A computer-implemented method for executing a query specification, comprising:
    evaluating, by a first computing device, a first query specification to identify at least one expression of a set of expressions as a candidate expression to be executed by a second computing device hosting a source of data specified in the candidate expression;
    determining a cost estimate of executing the candidate expression at the first computing device;
    determining whether the cost estimate of executing the candidate expression at the first computing device is greater than a threshold; and
    replacing the candidate expression with a native query function when the cost estimate of executing the candidate expression at the first computing device is greater than the threshold, wherein the native query function is wrapped with a value indicative of the requirement to inject a context parameter and wherein the native query is wrapped with metadata that represents a dimensionality of returning results indicative of level member hierarchies that will be included in a result of the native query function.

* * * * *